United States Patent Office

3,228,856
Patented Jan. 11, 1966

3,228,856
METHOD FOR CULTURING MICRO-ORGANISMS
IN A CLOSED APPARATUS
Charles S. Federle, 1440 Cardington Road,
Kettering, Ohio
No Drawing. Filed Nov. 14, 1960, Ser. No. 68,678
3 Claims. (Cl. 195—102)

The present invention relates to a process for organism growth and more particularly to a process for organism energization. The invention relates still more particularly to a process for providing food and other materials.

The invention relates to a process employing hydrogen or hydrogen peroxide to produce bacterial growth, and involving regeneration of the hydrogen from the side products of the bacterial growth and from decomposition products obtained upon utilization of the bacteria.

The advent of the space age has focused attention upon the desirability of self contained systems for production of food and other materials.

The present invention involves a process in which water is split electrolytically or by radiation to form hydrogen and oxygen, the hydrogen is conducted to a "hydrogen loving" bacterial culture, the bacteria is fed to higher animals, and the aqueous waste product from the higher animals is then recycled to the water splitting unit and separated into hydrogen and oxygen.

Viewed in one of its simplest aspects, the present invention comprises splitting water into hydrogen and oxygen, growing bacteria with the hydrogen and oxygen, and recycling the water formed during the bacterial growth back to the water splitting unit.

The present process employs "hydrogen loving" bacteria which will grow in the dark. Thus, the only energy source required in the present system is that for the water splitting unit.

In the water splitting unit of the present invention it is preferred to employ radiation as the water splitting means. Any source of electrons, or alpha, beta, or gamma rays can be utilized, but it will be recognized that radioactive materials such as certain waste or partial decomposition materials from an atomic pile are particularly suitable. Cobalt 60, for example, is a suitable source.

If desired and convenient, according to one aspect of the invention, the water is split by electrolysis in a suitable cell which employes electric current to decompose water, collecting hydrogen at one electrode and oxygen at the other electrode.

Any kind of organism which contains hydrogenase can be utilized as the synthesizer of organic matter in the present invention, and it can be supported on any type of culture suitable for maintaining it while its growth is energized by hydrogen. Various "hydrogen loving" bacteria, and cultures suitable for maintaining them are known to those skilled in the art.

Among bacteria suitable for use in the present invention are *Aliphaticum liquefaciens, Methanomonas methanica, Carboxydomonas oligocarbophilia, E. coli, E. coli* var. *acidilactica, B. formicus, B. pyconoticus, Hydrogenomonas pantotropha, H. facilis,* and *Acetobacter peroxidans.* It will be recognized that the bacteria are suitable whether designated by the foregoing names or by other recognized nomenclature, i.e., both *Escherichia coli* and the equivalent *Bacterium coli commune* are suitable.

One type of algae suitable for use in the present invention is *Ankistrodesmus braunii* because it too can be energized by the oxidation of molecular hydrogen.

Examples of suitable cultures for several bacteria are illustrated below.

*Hydrogenomonas pantotrophus* may utilize a medium, for example, of 1 part $NaHCO_3$; 1 part $NH_4Cl$; 0.5 part $KH_2PO_4$; 0.1 part $MgSO_4$; 0.1 part $NaCl$; 0.01 part $FeSO_4$; 1,000 parts water; and 0.0005 part each of salts of cobalt, copper, iodine, molybdenum, and zinc; all parts by weight. Adjust pH to 7.5, maintain 25° C., agitate violently with oxygen, hydrogen, and carbon dioxide.

*Hydrogenomonas utilis* grow at rates such as 15 grams wet weight per 8 liters of medium in 18 hours. *Bacillus megatherium* grows, for example, on a hydrogen, oxygen, carbon dioxide, minerals solutions, or on a 5% aqueous sugar solution, especially at about 35° C., with circulation of sterile air at a rate of at least 0.1 volume per volume of medium per minute.

It will be recognized that the present invention does not reside in the various ways of culturing bacteria, but the same are only means employed in carrying out the present invention, and in the light of the present teaching those skilled in the art can select suitable organisms and cultures for effecting the present invention; for example, any of the "hydrogen loving" or autotropic bacteria and their methods of culture can be employed as described in Industrial Microbiology by Prescott and Dunn; or Shotz, A. and Bovell, C., 1952, J. Bacteriology, vol. 63, page 87, which is incorporated herein by reference.

It is possible to conduct both the electrolysis and bacteria culture in one closed chamber containing units for both. The water was extracted from the air inside the chamber by condensing the moisture on a cone arranged so the water would drip into the water splitting unit. A kilogram of garden soil was mixed with 3 liters of hard tap water (300 p.p.m. $CaCO_3$, pH 7.8) and strained through a coarse nylon cloth. The retained solids were heated to sterilize them, and then mixed with the filtrate and placed in the bottom of a sealed chamber 90 centimeters square with a height of 20 centimeters. The chamber had an electrolysis unit near the center. Electric current was passed into the chamber and caused the water in the electrolysis unit to be split, 15 milliliters of water being changed to hydrogen and oxygen in a 24 hour period. *Lumbricus terrestris* were put in the chamber, and they made holes and paths in the soil which are characteristic of vigorous growth.

An alternate method is to decompose the hydrogen peroxide in a culture of bacteria which are known to utilize solutions of hydrogen peroxide as an energy source for their life processes.

*Acetobacter peroxidans* can energize its growth from the decomposition of hydrogen peroxide, and a culture of this bacteria may supplement the culture of the Hydrogenomonas in this invention. If desired, the *Acetobacter peroxidans* can replace the Hydrogenomonas if slight modifications are made. Such a system may be used under various types of situations. If used in a vehicle using hydrogen peroxide in its propulsion means, a special advantage accrues from using the Acetobacter because it provides an alternate, non-competitive method of energizing the process for organism growth.

Having described my invention, I claim:

1. A process for growing bacteria which comprises splitting metabolic water into hydrogen and oxygen, utilizing the hydrogen in a suitable nutrient culture medium to support the growth of bacteria capable of utilizing hydrogen, recovering metabolic water formed during the bacteria growth and recycling the metabolic water to the metabolic water splitting step, and removing bacteria from the culture medium.

2. The method of claim 1 in which the metabolic water is split by electrolysis.

3. The method of claim 1 in which metabolic water is split by nuclear fission radiation.

References Cited by the Examiner

FOREIGN PATENTS 760,691  11/1956  Great Britain.

OTHER REFERENCES

Bergey's Manual, 7th ed., 1957, Williams and Wilkins Co., published by Waverly Press, Inc., Baltimore, Maryland, page 75.

Werkman et al.; Bacterial Physiology, Academic Press Inc., 1951, New York, pages 378 and 382.

A. LOUIS MONACELL, *Primary Examiner.*

TOBIAS E. LEVOW, ABRAHAM H. WINKELSTEIN,
*Examiners.*